(12) United States Patent
Paillard

(10) Patent No.: US 7,321,799 B2
(45) Date of Patent: Jan. 22, 2008

(54) FLEXIBLE INTERFACE FOR CONTROLLING A MOTION PLATFORM

(75) Inventor: Bruno Paillard, Sherbrooke (CA)

(73) Assignee: D-Box Technologies Inc., Longueuil, Québec (CA)

(*) Notice: Subject to any disclaimer, the term of this patent is extended or adjusted under 35 U.S.C. 154(b) by 265 days.

(21) Appl. No.: 10/844,457

(22) Filed: May 13, 2004

(65) Prior Publication Data

US 2004/0249484 A1 Dec. 9, 2004

Related U.S. Application Data

(60) Provisional application No. 60/470,198, filed on May 14, 2003.

(51) Int. Cl.
*G05B 15/02* (2006.01)

(52) U.S. Cl. .......................................................... 700/9

(58) Field of Classification Search .................... 700/9, 700/3, 13, 11, 60, 61, 50, 18; 706/45, 52, 706/900; 60/545
See application file for complete search history.

(56) References Cited

U.S. PATENT DOCUMENTS

| 3,699,317 | A | * | 10/1972 | Middleditch ................ 700/187 |
| 5,527,184 | A | * | 6/1996 | Trumbull ....................... 434/69 |
| 5,533,336 | A | * | 7/1996 | Kiat et al. ..................... 60/533 |
| 5,678,889 | A | * | 10/1997 | Purcell, Jr. ................... 297/257 |
| 5,684,722 | A | * | 11/1997 | Thorner et al. ................ 703/3 |
| 5,768,122 | A | * | 6/1998 | Motoc ........................... 700/50 |
| 6,195,596 | B1 | * | 2/2001 | Kim ............................. 700/245 |
| 6,542,925 | B2 | * | 4/2003 | Brown et al. ............... 709/208 |
| 6,662,560 | B2 | * | 12/2003 | Roy et al. ...................... 60/545 |

* cited by examiner

*Primary Examiner*—Thomas K. Pham
(74) *Attorney, Agent, or Firm*—Ogilvy Renault, LLP

(57) ABSTRACT

A method and apparatus is disclosed for providing a motion signal to a motion platform comprising a plurality of actuators. The apparatus comprises a formatting unit receiving a motion signal indication of a motion to perform on the motion platform and formatting the motion signal and a synchronizing unit receiving the formatted signal and providing a synchronized and formatted motion signal to the motion platform.

20 Claims, 8 Drawing Sheets

FLEXIBLE INTERFACE FOR CONTROLLING A MOTION PLATFORM

CROSS-REFERENCE TO RELATED APPLICATIONS

This patent application claims priority of U.S. provisional patent application No. 60/470,198, entitled "Flexible interface for controlling a motion platform" and that was filed May 14, 2003, the specification of which is hereby incorporated by reference.

TECHNICAL FIELD

This invention relates to the field of motion generators. More precisely, this invention pertains to a flexible interface for controlling a motion platform.

BACKGROUND OF THE INVENTION

Providing movements to a motion platform using a processing unit is very desirable enhances a user's experience by increasing the impression of realism.

Unfortunately, prior art systems for providing movements to a platform suffer from many drawbacks. For instance, a lot of processing is required for using a motion signal provided to the motion platform in real time.

Furthermore, in cases where a lot of processing is performed by the processing unit, delays are often experienced by users. This can generate frustration especially if an effect must be delivered to the simulator without any delay.

Also, prior art systems do not provide the capability of hot-swapping and do not allow easy faults management.

There is therefore a need for a method and apparatus that will overcome the above-identified drawbacks.

SUMMARY OF THE INVENTION

It is an object of the invention to provide motion to a motion platform comprising a plurality of actuators. This object can be embodied in a method or apparatus.

According to a first aspect of the invention, there is provided a method for controlling a motion platform. The method comprises providing a motion signal indicative of a motion to perform, formatting the motion signal according to a protocol, synchronizing the formatted motion signal in accordance with a sampling rate compatible with the motion platform, and providing the synchronized signal to the motion platform to thereby control the motion platform.

According to another aspect of the invention, there is provided a motion controlling unit for controlling a motion platform. The motion controlling unit comprises a formatting unit receiving a motion signal indicative of a motion to be performed on the motion platform and formatting the motion signal according to a protocol. The motion control unit further comprises a synchronizing unit receiving and synchronizing the formatted motion signal in accordance with a sampling rate compatible with the motion platform to provide a synchronized motion signal to the motion platform.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF A PREFERRED EMBODIMENT

Figure 1:
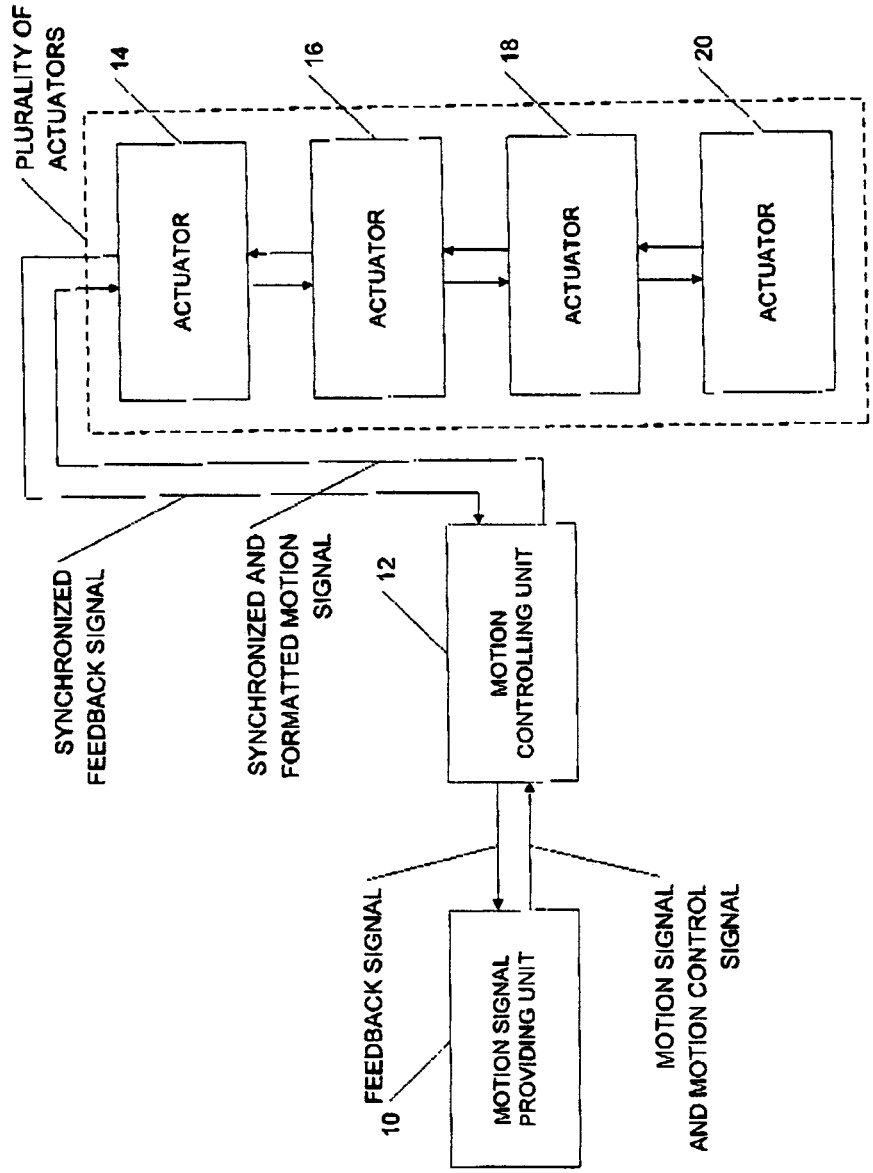
FIG. 1 is a block diagram showing a system for providing motion to a user according to an embodiment of the invention.

Now referring to FIG. 1, there is shown a diagram of a system providing motion to a user using a motion signal providing unit 10.

More precisely, the system comprises a motion signal providing unit 10, a motion controlling unit 12 and a plurality of actuators 14 to 20.

In a preferred embodiment, motion signal providing unit 10 is a personal computer such as a PC or the like. Alternatively, motion signal providing unit 10 may be a home video game system also referred to as a "console".

Motion signal providing unit 10 provides a motion signal and a motion control signal to motion controlling unit 12. Motion signal providing unit 10 receives a feedback signal from motion controlling unit 12. In a preferred embodiment, motion signal comprises preferably a position signal for each of the plurality of actuators.

Still in a preferred embodiment, feedback signal provides information related to internal state of each of the plurality of actuators. The skilled addressee will appreciate that such a feature enables a dynamic management of errors occurring at an actuator of the plurality of actuators as well as auto-instrumentations of the plurality of the actuators for maintenance purposes, performance evaluation and tests.

In a preferred embodiment, the motion signal and the motion control signal are provided to motion controlling unit 12 using a direct wire connection which is preferably a Universal Serial Bus (USB). Alternatively, the motion signal and the motion control signal are provided through a network which may be any of a Local Area Network (LAN), a Wide Area Network (WAN) or the like. Similarly, the feedback signal may be provided to motion signal providing unit 10 using similar alternative ways.

Motion controlling unit 12 receives the motion signal and the motion control signal from motion signal providing unit 10 and provides a synchronized and formatted motion signal to plurality of actuators in accordance with a protocol.

Motion controlling unit 12 receives a synchronized feedback signal from plurality of actuators 14 to 20 accordance with the protocol.

The protocol is preferably a master-slave protocol where each of the plurality of actuators is a slave. Such a protocol enables an optimal use of the available bandwidth and further simplifies the management of actuators 14 to 20 in which processing is preferably limited. Furthermore, the protocol further integrates the management of communication errors, which renders communication robust and enables dynamic disconnection or dynamic reconnection (i.e. hotswap) of an actuator, with an automatic resynchronization during reconnection. The throughput is preferably equal to 57600 bauds which enables a sampling frequency of 400 Hz and a compatibility with various other systems.

In a preferred embodiment, motion controlling unit 12 is implemented using a Digital Signal Processor (DSP) and embedded signal processing software which enable playback of a motion signal on a plurality of actuators.

Still in a preferred embodiment, the plurality of actuators comprises a first actuator 14, a second actuator 16, a third actuator 18 and a fourth actuator 20. Preferably, each one of the plurality of actuators is respectively located under and at a corner of a sofa as shown in U.S. Pat. No. 6,585,515, the specification of which is hereby incorporated by reference. Many other configurations are envisioned such as having less than four actuators, having one or more pivot points, incorporating the actuators to the structure of a seating device, replacing the legs of a seating device by actuators, or any combination thereof.

It will be appreciated by the skilled addressee that any given number of motion platforms may be controlled using a suitable number of four actuators.

In a preferred embodiment, notion controlling unit 12 provides the synchronized and formatted motion signal to first actuator 14. First actuator 14 provides the synchronized and formatted motion signal to second actuator 16. Second actuator 16 provides the synchronized and formatted motion signal to third actuator 18. Third actuator 18 provides the synchronized and formatted motion signal to fourth actuator 20.

It should be understood that such a scheme for connecting actuators 12 to 20 to provide a synchronized motion signal to them is not limitative and that alternative embodiments are possible.

It should also be understood that in a preferred embodiment, first actuator 14, second actuator 16, third actuator 18 and fourth actuator 20 share a data bus through which the synchronized and formatted motion signal propagates.

Similarly, fourth actuator 20 provides the synchronized feedback signal to third actuator 18. Third actuator 18 provides the synchronized feedback signal to second actuator 16. Second actuator 16 provides the synchronized feedback signal to first actuator 14 and the latter provides the synchronized feedback signal to motion controlling unit 12.

It should be understood that such a scheme for connecting actuators 12 to 20 to receive the synchronized motion signal from them is not limitative and that alternative embodiments are possible.

It should also be understood that in a preferred embodiment, first actuator 14, second actuator 16, third actuator 18 and fourth actuator 20 share a data bus through which the synchronized feedback signal propagates.

Figure 2:
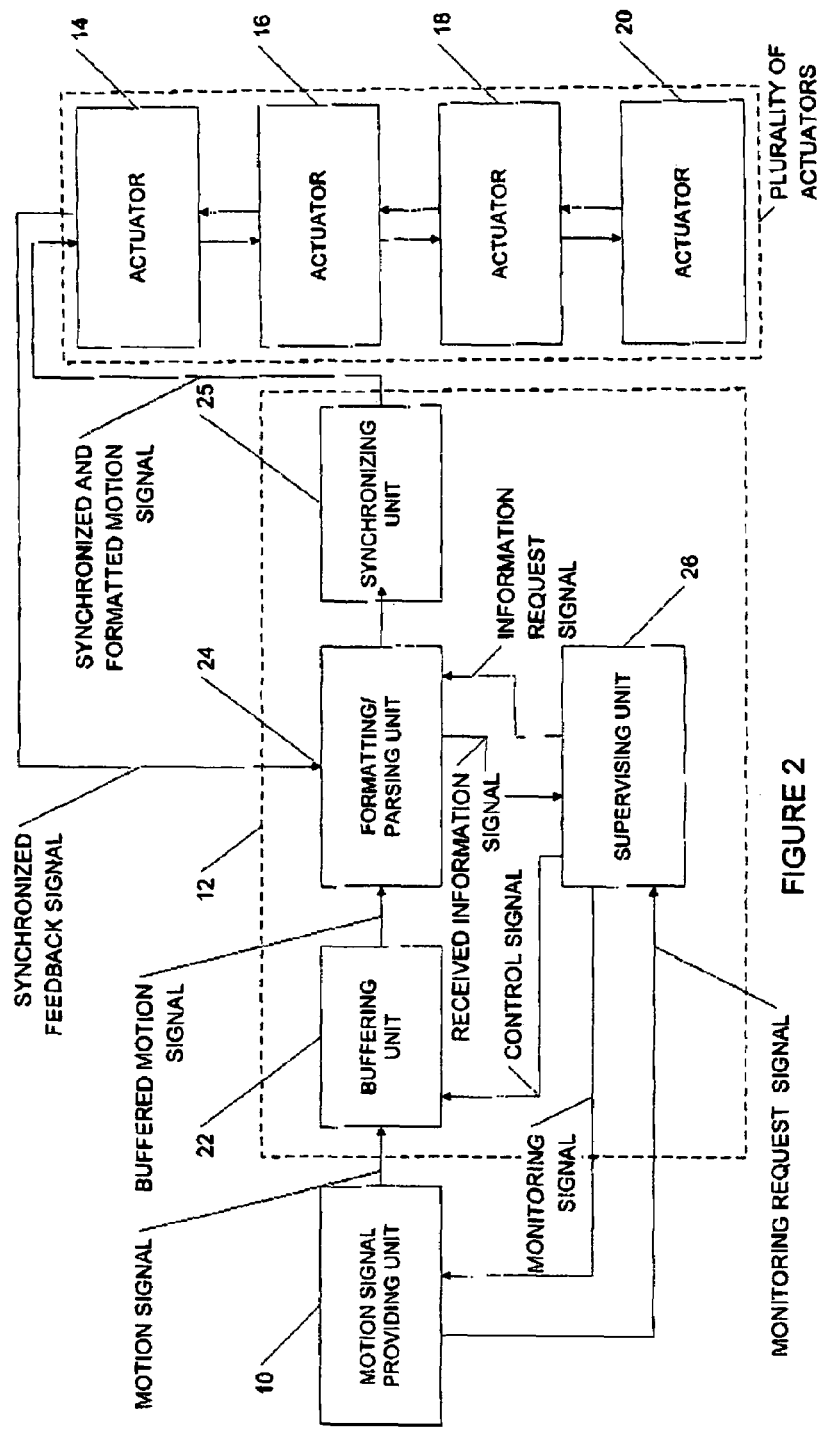
FIG. 2 is a block diagram showing a first embodiment of a motion controlling unit which comprises a buffering unit, a formatting/parsing unit, a synchronizing unit and a supervising unit.

Now referring to FIG. 2, there is shown a first embodiment of motion controlling unit 12.

Motion controlling unit 12 comprises a buffering unit 22, a formatting/parsing unit 24, a synchronizing unit 25 and a supervising unit 26.

Buffering unit 22, described herein below, receives the motion signal from motion signal providing unit 10 and provides a buffered motion signal. Formatting/parsing unit 24 receives and formats the buffered motion signal provided by buffering unit 22 in order to provide a formatted signal to synchronizing unit 25. Synchronizing unit 25 synchronizes the formatted signal and provides the synchronized and formatted motion signal to the plurality of actuators.

Buffering unit 22 is controlled by supervising unit 26 using the control signal. Supervising unit 26 is used in order to control buffering unit 22 and formatting/parsing unit 24.

More precisely, upon request from motion signal providing unit 10, via the monitoring request signal, supervising unit 26 may send an information request signal to formatting/parsing unit 24. Upon reception of the information request signal, formatting/parsing unit 24 will create the formatted motion signal wherein an indication of a specific request for information is inserted. Such insertion scheme will be further detailed below. It will be appreciated that buffering unit 22, formatting/parsing unit 24, synchronizing unit 25 as well as supervising unit 26 are accessed via high level functions included in an API provided on motion providing unit 10.

When receiving the synchronized feedback signal from the plurality of actuators, the formatting/parsing unit 24 extracts information related to the information request signal provided earlier. Formatting/parsing unit 24 provides a received information signal to supervising unit 26. Supervising unit 26 then provides a monitoring signal, indicative of the received information signal, to motion signal providing unit 10. Again, such provision is performed using functions included in the API.

It should be appreciated that while in this embodiment a single unit performs the formatting and the parsing, two separate units may alternatively be provided, each of which would perform one of formatting and parsing.

The function of synchronizing unit 25 is to provide the synchronized and formatted signal more simply, the synchronized signal to the plurality of actuators in accordance with a sampling rate compatible with the plurality of actuators. A sampling rate compatible with the plurality of actuators enables en efficient use of a bandwidth.

Figure 3:
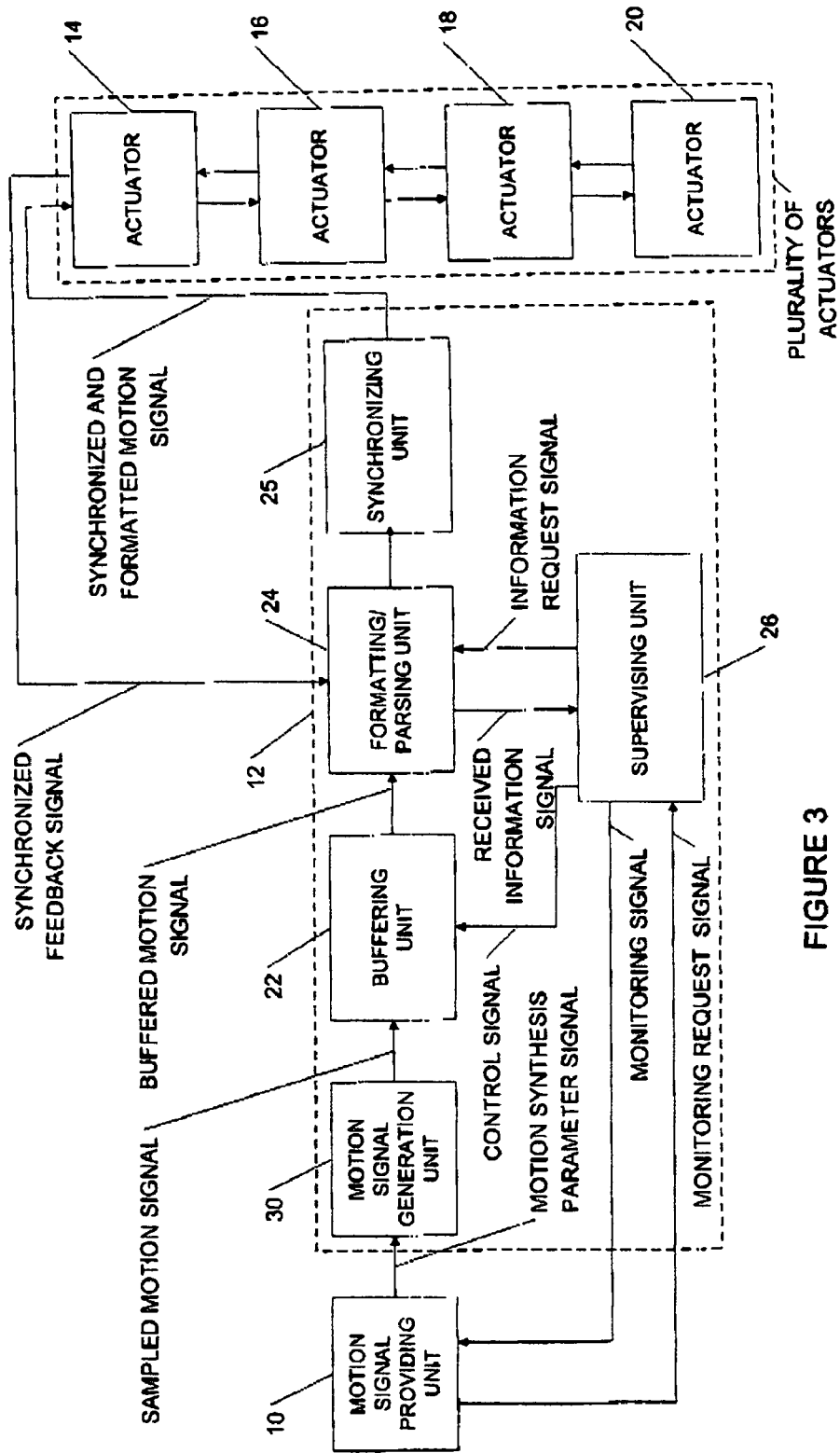
FIG. 3 is a block diagram showing a second embodiment of the motion controlling unit which further comprises a motion signal generation unit.

Now referring to FIG. 3, there is shown a second embodiment of motion controlling unit 12. In this second embodiment, motion controlling unit 12 further comprises a motion signal generation unit 30 which generates a sampled motion signal in response to a motion synthesis parameter signal.

The motion synthesis parameter signal is used to define a motion signal which comprises a position signal for each of the plurality of actuators. For instance, the motion synthesis parameter signal may for instance define the motion signal using a function or a combination of function such as sinus, tan, log or the like, an amplitude signal, a frequency envelope, a time envelope, a library of signals or a filtered excitation signal, specifying excitation and filter parameters.

It will be appreciated by the skilled addressee that such embodiment is of great advantage as limited processing is required for the motion providing unit 10. However, because of processing power limitations the number of sampled motion signals that can be generated by the motion signal generation unit 30 may be limited.

Figure 4:
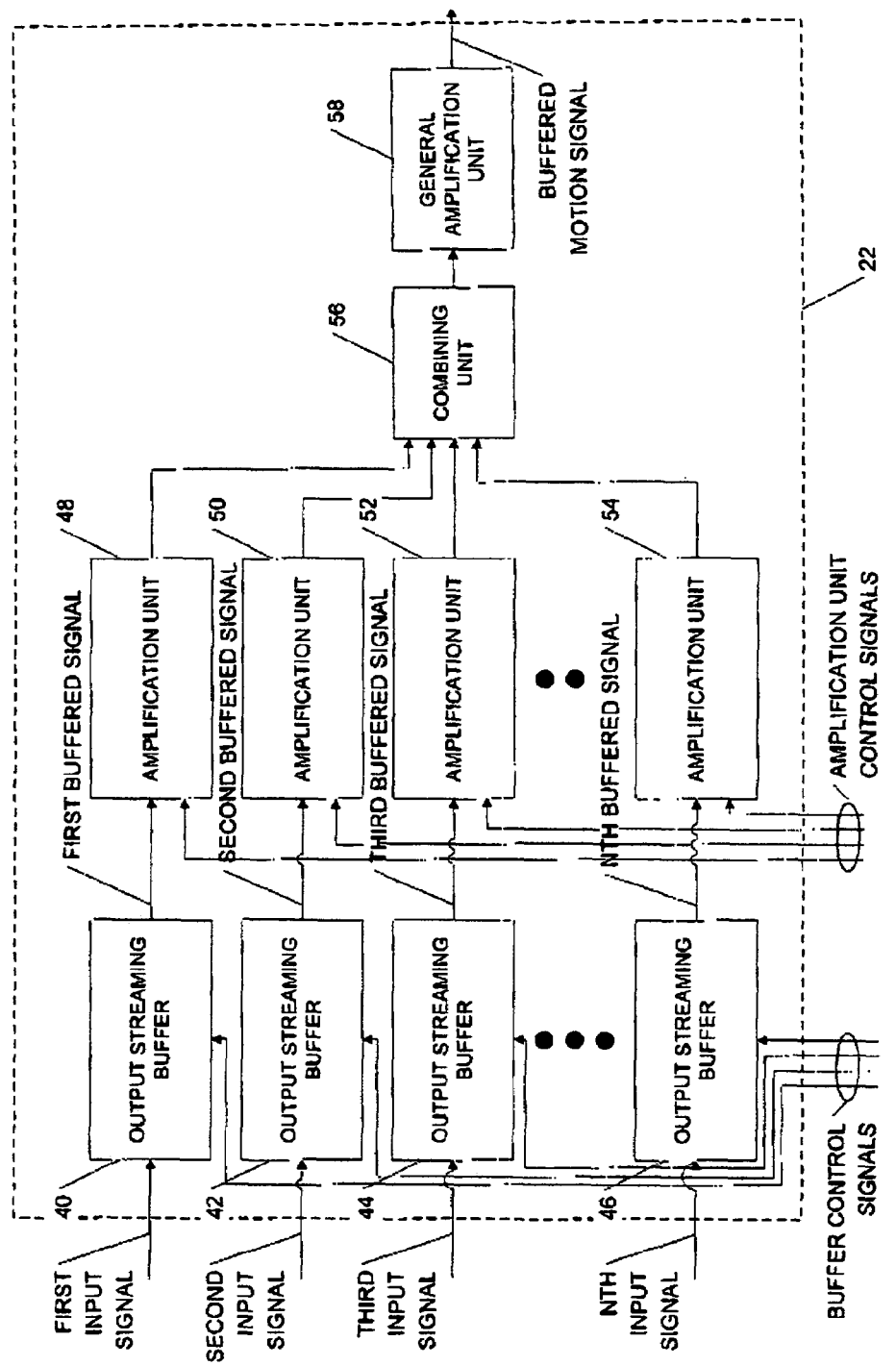
FIG. 4 is a block diagram showing a preferred embodiment of the buffering unit; the buffering unit comprises a plurality of output streaming buffers, a plurality of amplification units, a combining unit and a general amplification unit.

Now referring to FIG. 4, there is shown a preferred embodiment of buffering unit 22. Buffering unit 22 comprises a plurality of output streaming buffers 40 to 46, a plurality of corresponding amplification units, a combining unit 56 and a general amplification unit 58.

In a preferred embodiment, each output streaming buffer has a defined size. Furthermore each output streaming buffer 40 to 46 may be controlled using a corresponding buffer control signal.

Via the buffer control signal, the size of a given output streaming buffer may be provided to the motion signal providing unit 10 in response to a request to that effect. Another given output streaming buffer may be emptied by the motion signal providing unit 10 via the buffer control signal. An indication of a current amount of data may also be provided to the motion signal providing unit 10 in response to a request to that effect.

In fact it will be appreciated that such an embodiment is of great advantage in that an input signal may be provided to a given output streaming buffer which has specific characteristic suitable for executing an effect.

The skilled addressee will appreciate having several output streaming buffers to choose from helps in obtaining a low playback latency for time-critical motion segments, while at the same time allowing motion signal providing unit 10 to buffer large motion segments, therefore minimizing its workload. If there was only one output streaming buffer available, new data placed in the output streaming buffer by motion signal providing unit 10 would have to wait until all data previously in the output streaming buffer had been played, before going out to the actuators. In order to allow a low latency for time-critical segments, the output streaming buffer would have to be kept almost empty at all times. This would greatly increase the update rate of motion signal providing unit 10, which would have to feed the output streaming buffer often to avoid interruptions in the stream. The use of a plurality of output streaming buffers makes it possible for the motion signal providing unit 10 to provide some continuous motion and further time-critical segments immediately. Such embodiment also enables the combination of a plurality of signals using the combining unit 56.

It will be appreciated that each amplification unit is controlled by an amplification unit control signal. The amplification unit control signal provides an indication of an amplification to perform on a given buffered signal.

The skilled addressee will therefore appreciate that the amplitude of a given buffered signal may be increased or decreased. Furthermore, fade-in and fade-out functions may be performed using an amplification unit.

In the embodiment disclosed, the plurality of output streaming buffers comprises a first output streaming buffer 40, a second output streaming buffer 42, a third output streaming buffer 44 and an Nth output streaming buffer 46. The plurality of corresponding amplification units comprise a first amplification unit 48, a second amplification unit 50, a third amplification unit 52 and an Nth amplification unit 54.

Each output streaming buffer is connected to a corresponding amplification unit. For instance, first output streaming buffer 40 receives a first input signal and provides a first buffered signal to first amplification unit 48. First amplification unit 48 then provides a signal to combining unit 56.

Combining unit 56 combines all signals provided by each of the plurality of amplification units and provides a combined signal to general amplification unit 58. General amplification unit 58 amplifies the combined signal and provides an amplified combined signal.

In a preferred embodiment, the plurality of output streaming buffers comprise six output streaming buffers. Still in a preferred embodiment, one of the six output streaming buffers has a size of 15000 samples while the five other output streaming buffers have a size of 3000 samples.

Figure 5:
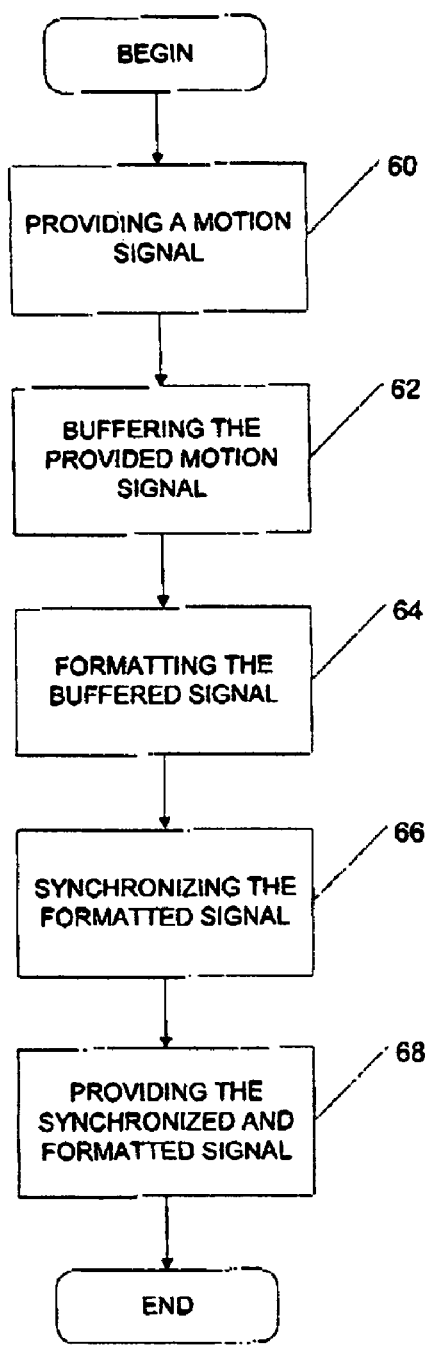
FIG. 5 is a flowchart showing how a motion signal is provided to the plurality of actuators according to an embodiment of the invention.

It will be appreciated that preferably when run dry, i.e. when the output streaming buffers are empty, as for example when the motion controlling unit 12 is just started, each output streaming buffer keeps outputting the last value it contained. Accordingly, it is possible to use one of the plurality of output streaming buffers for static offset adjustment of the actuator Now referring to FIG. 5, there is shown how the motion signal is provided to the plurality of actuators. According to step 60 a motion signal is provided by motion signal providing unit 10 to motion controlling unit 12.

More precisely, in a first embodiment disclosed in FIG. 2, the motion signal is provided to buffering unit 22 of motion controlling unit 12. The motion signal is provided via a function of the API and comprises, as explained above, a position signal for each corresponding actuator.

Figure 6:
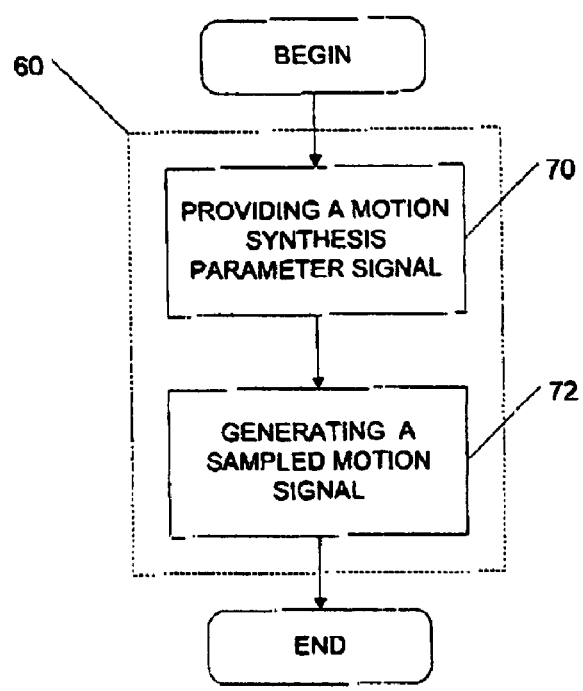
FIG. 6 is a flowchart showing an alternative embodiment for providing the motion signal.

Now referring to FIG. 6, there is shown another embodiment for providing the motion signal. In such embodiment, the provision of the motion signal comprises provision on a motion synthesis parameter signal according to step 70 and generating a corresponding sampled motion signal according to step 72.

More precisely, the motion signal providing unit 10 provides a motion synthesis parameter signal to motion signal generation unit 30 disclosed in FIG. 3. The corresponding sampled motion signal is generated by motion signal generation unit 30.

Figure 7:
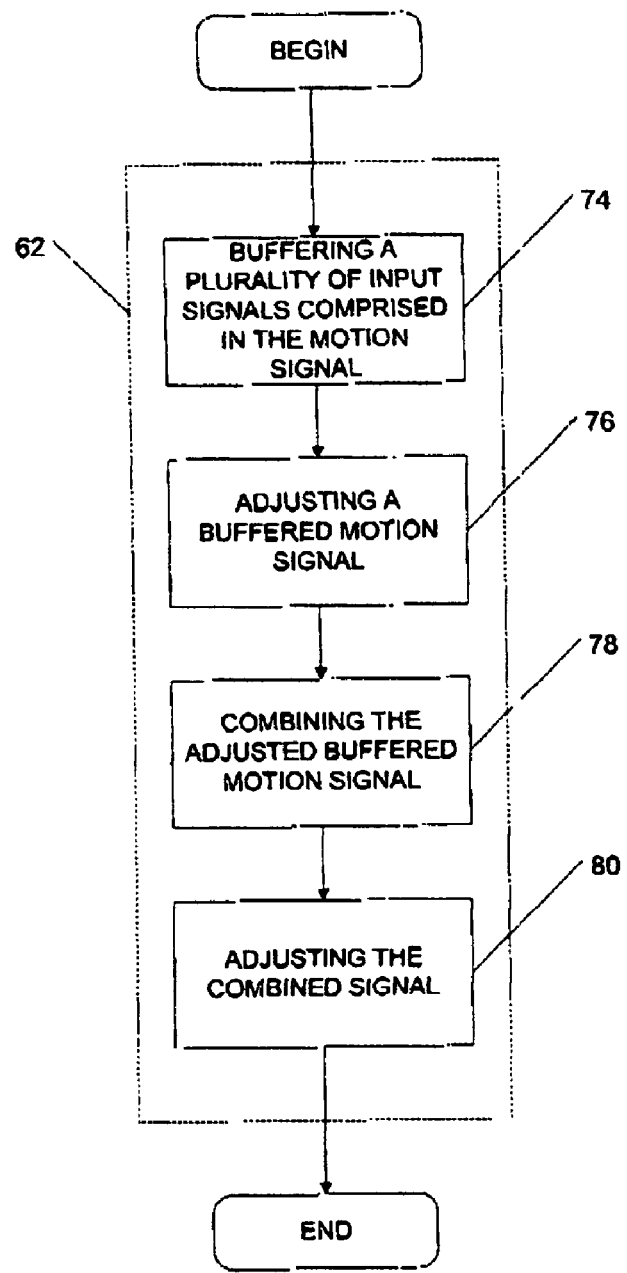
FIG. 7 is a flowchart showing how the motion signal is buffered.

Now referring back to FIG. 5 and according to step 62, the motion signal is buffered. Now referring to FIG. 7, there is shown how the motion signal is buffered. According to step 74, the plurality of input signals comprised in the provided motion signal are buffered. More precisely and referring back to FIG. 4, the plurality of input signals are buffered using the plurality of output streaming buffers. As explained previously the plurality of output streaming buffers comprises output streaming buffers having larger sizes than others.

According to step 76, each buffered motion signal provided by a given output streaming buffer of the plurality of output streaming buffers is adjusted and such adjustment is performed using a corresponding amplification unit.

According to step 78, all adjusted synchronized signals are combined together using the combining unit 56. According to step 80, the combined signal is adjusted. In a preferred embodiment, the combined signal is adjusted using the general amplification unit 58.

It should be appreciated that in an alternate embodiment, no buffering is performed. In such cases, motion signal providing unit 10 has a sufficient processing power to provide the motion signal.

Now referring back to FIG. 5 and according to step 64, the buffered motion signal is formatted. In a preferred embodiment, the buffered motion signal is formatted by the formatting/parsing unit 24. According to step 66, the formatted motion signal is synchronized. In a preferred embodiment, the formatted motion signal is synchronized using synchronizing unit 25.

It should be understood that the providing a synchronous signal enables a spectral control of motion profiles on all the bandwidth in-use which is from 0 to 100 Hz. The sampling rate is 400 samples/s.

Figure 8A:
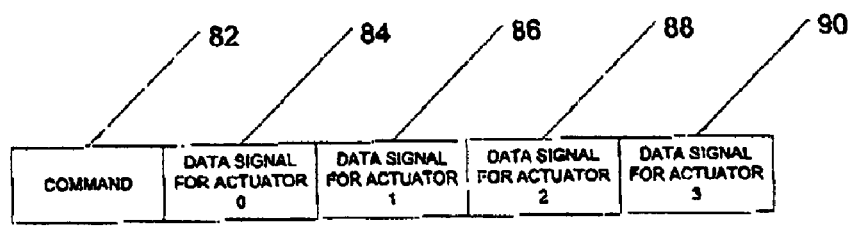
FIG. 8a is a diagram showing an example of a synchronized and formatted motion signal.

Now referring to FIG. 8*a*, there is shown an example of a data packet of the formatted and synchronized motion signal provided synchronously to the plurality of actuators.

The data packet comprises a time slot 82 for receiving a command, a time slot 84 for receiving a data signal for first actuator 14, a time slot 86 for receiving a data signal for second actuator 16, a time slot 88 for receiving a data signal for third actuator 18 and a time slot 90 for receiving a data signal for fourth actuator 20.

In a preferred embodiment, the time slots 84, 86, 88 and 90 are 16-bit words which are preferably position samples for each of the plurality of actuators. Still in a preferred embodiment, each data packet is preceded by an "idle-line" which has a duration of at least one transmitted byte. It will further be appreciated that by adjusting the size of the "idle-line" at the beginning of the data packet, it is possible to finely adjust the sampling rate.

Figure 8B:
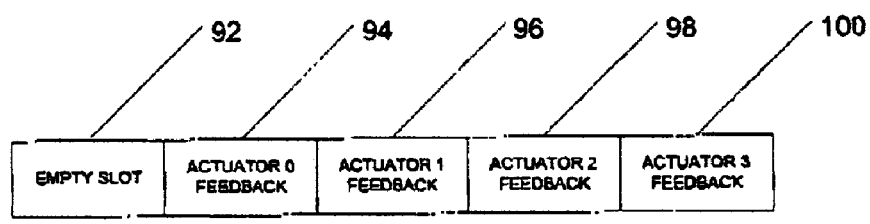
FIG. 8b is a diagram showing an example of a synchronized feedback signal.

Now referring to FIG. 8*b*, there is shown an example of a data packet of the synchronized feedback signal. The data packet comprises an empty time slot 92, a time slot 94 for receiving feedback data from first actuator 14, a time slot 96 for receiving feedback data from second actuator 16, a time slot 98 for receiving feedback data from third actuator 18 and a time slot 100 for receiving feedback data from fourth actuator 20.

It will be appreciated that such synchronized feedback signal is of great advantage in order to detect errors such as communication faults (such as an interruption in the communication stream), hardware faults (such as violent over-current in a power bridge), software faults (such as excessive conditions such as an over-weight person on the moving platform), temporary conditions (such as too dynamic motion that will dissipate normally).

Now referring back to FIG. 5 and according to step 68, the synchronized and formatted signal is provided to the plurality of actuators. As mentioned previously, the synchronized and formatted signal is provided synchronously to the plurality of actuators.

The embodiments of the invention described above are intended to be exemplary only. The scope of the invention is therefore intended to be limited solely by the scope of the appended claims.

I claim:

1. A method for controlling a motion platform for providing motion synchronized with an audio/video program, said method comprising:
   providing a motion signal indicative of a motion to be performed by said motion platform and comprising a plurality of motion sub-signals, said motion to be synchronized with said audio/video program;
   buffering each one of said plurality of motion sub-signals in parallel by providing each one of said plurality of motion sub-signals to one of a plurality of buffers;
   combining the buffered plurality of motion sub-signals to provide a buffered motion signal;
   formatting the buffered motion signal according to a synchronous protocol to produce a corresponding data packet; and
   synchronously providing, according to said protocol, said data packet to said motion platform to thereby control said motion platform.

2. The method as claimed in claim 1, wherein said motion platform comprises at least one actuator, further wherein said synchronized signal is provided to said at least one actuator.

3. The method as claimed in claim 1, wherein said buffering comprises providing each of the plurality of motion sub-signals to a selected one of the plurality of buffers according to a criterion.

4. The method as claimed in claim 3, wherein said criterion comprises at least one of a size of the selected buffer, an amount of data existing in said selected buffer and a latency requirement for said motion signal.

5. The method as claimed in claim 1, further comprising performing at least one of increasing a volume of said buffered motion signal, decreasing said volume of said buffered motion signal, performing a fade-in on said buffered motion signal and performing a fade-out on said buffered motion signal.

6. The method as claimed in claim 1, wherein said providing of a motion signal comprises synthesizing said motion signal using a motion synthesis parameter signal provided by a processing unit.

7. The method as claimed in claim 6, wherein said motion synthesis parameter signal comprises at least one of an amplitude signal, a frequency envelope and a time envelope.

8. The method as claimed in claim 1, wherein said providing of said motion signal is performed by one of a home video game system and a personal computer system.

9. A motion controlling unit for controlling a motion platform for providing motion synchronized with an audio/video program, said motion controlling unit comprising:
   a buffering unit for receiving a motion signal comprising a plurality of motion sub-signals indicative of a motion to be performed on said motion platform, and having a plurality of buffers each for buffering at least one motion sub-signal;
   a combining unit for combining the buffered plurality of motion sub-signals to provide a buffered motion signal, said motion to be synchronized with said audio/video program;
   a formatting unit receiving said buffered motion signal and formatting said motion signal according to a synchronous protocol to produce a corresponding data packet having a sampling rate compatible with said motion platform; and
   a synchronizing unit receiving and synchronously providing, according to said protocol, said data packet to said motion platform to thereby control said motion platform.

10. The motion controlling unit as claimed in claim 9, wherein each buffer of said plurality of buffers is for receiving at least one motion sub-signal according to a criterion.

11. The motion controlling unit as claimed in claim 10, wherein said criterion comprises at least one of a size of a given buffer, an amount of data existing in a given buffer and a latency requirement.

12. The motion controlling unit as claimed in claim 9, further comprising a motion signal generation unit receiving a signal indicative of a motion signal to generate and generating said motion signal.

13. A method for controlling a motion platform for providing motion synchronized with an audio/video program, said method comprising:
   providing a motion signal indicative of a motion to be performed by said motion platform, said motion to be synchronized with said audio/video program;
   formatting the motion signal according to a synchronous protocol to produce a corresponding data packet, said motion platform comprising at least one actuator;
   inserting a request for feedback in the formatted motion signal;
   synchronously providing, according to said protocol, said data packet to said at least one actuator of said motion platform to thereby control said motion platform; and receiving a feedback signal from said at least one actuator in response to said request, said feedback signal being indicative of fault condition in said at least one actuator.

14. The method as claimed in claim 13, wherein said request comprises an indication of a specific information to be provided by said at least one actuator in said feedback signal.

15. The method as claimed in claim 13, wherein said inserting is performed in response to a feedback request performed by a motion providing unit providing said motion signal.

16. The method as claimed in claim 13, further comprising providing at least one part of said feedback signal to a motion providing unit.

17. A motion controlling unit for controlling a motion platform having at least one actuator, for providing motion synchronized with an audio/video program, said motion controlling unit comprising:

a formatting unit receiving a motion signal indicative of a motion to be performed on said motion platform, said motion to be synchronized with said audio/video program, formatting said motion signal according to a synchronous protocol to produce a corresponding data packet having a sampling rate compatible with said motion platform and inserting a request for feedback from said at least one actuator, said formatting unit comprising a parsing unit for parsing a feedback signal received from said at least one actuator in response to said request, said feedback signal being indicative of a fault condition in said at least one actuator; and a synchronizing unit receiving and synchronously providing, according to said protocol, said data packet to said motion platform to thereby control said motion platform.

18. The motion controlling unit as claimed in claim 17, further comprising a motion signal generation unit receiving a signal indicative of a motion signal to generate and generating said motion signal.

19. The motion controlling unit as claimed in claim 17, wherein said parsing unit is further for providing an indication of said feedback signal.

20. The motion controlling unit as claimed in claim 19, further comprising a supervising unit receiving said indication of said feedback signal and providing at least one part of said indication to said motion signal providing unit upon request.

* * * * *